March 16, 1954
C. J. POOLE
2,672,313
HYDRAULIC CAMERA TRIPOD HEAD
Filed Jan. 12, 1951
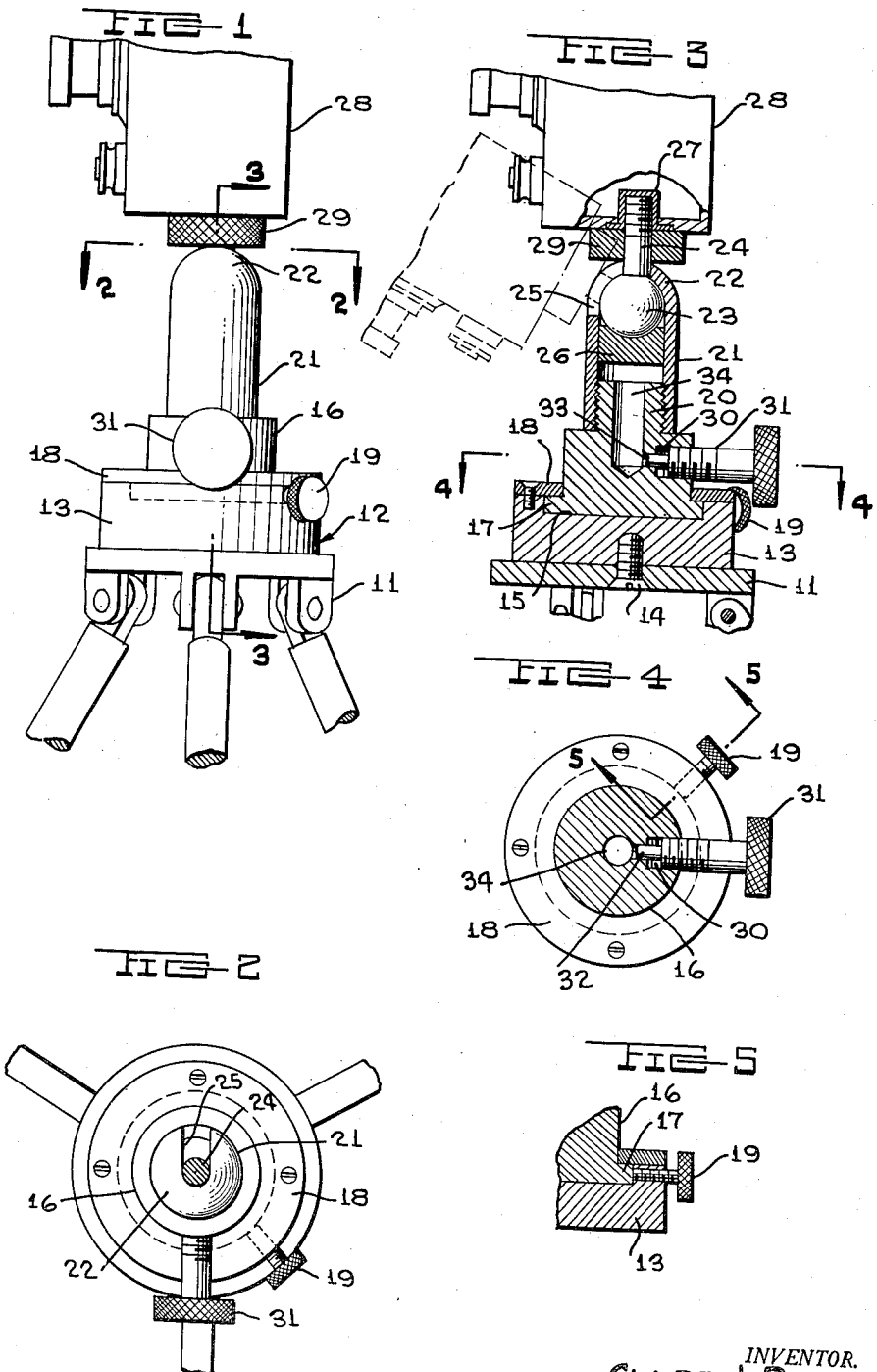
INVENTOR.
CLARE J. POOLE
BY
McMorrow, Berman + Davidson
ATTORNEYS Patented Mar. 16, 1954

2,672,313

UNITED STATES PATENT OFFICE 2,672,313

HYDRAULIC CAMERA TRIPOD HEAD

Clare J. Poole, Royal Oak, Mich.

Application January 12, 1951, Serial No. 205,795

2 Claims. (Cl. 248—183)

This invention relates to adjustable tripod heads for cameras, and more particularly to a tripod head which is hydraulically locked.

A main object of the invention is to provide a novel and improved adjustable camera tripod head which is simple in construction, which is universally adjustable, and which is readily adjustable to desired angular positions with a minimum amount of manipulation.

A further object of the invention is to provide an improved camera tripod head which is inexpensive to manufacture, which is rugged in construction, which is easy to operate, and which provides universal adjustment and secure clamping of its various elements with a minimum amount of wear of its relatively movable parts.

Further objects and advantages of the invention will become apparent from the following description and claims, and from the accompanying drawings, wherein:

Figure 1 is a fragmentary view of the top portion of a tripod provided with an improved adjustable camera supporting head according to the present invention, and showing a fragmentary portion of a camera mounted on the head;

Figure 2 is a cross-sectional view taken on line 2—2 of Figure 1;

Figure 3 is a cross-sectional view taken on line 3—3 of Figure 1;

Figure 4 is a cross-sectional view taken on line 4—4 of Figure 3;

Figure 5 is a cross-sectional detail view taken on line 5—5 of Figure 4.

Referring to the drawings, 11 designates the top portion of a conventional tripod, and 12 generally designates an improved camera tripod head according to the present invention which is mounted on the tripod top 11. The tripod head 12 comprises a cylindrical base member 13 which is secured to the tripod top 11 by a central screw 14 extending through the top of the tripod 11 and threadedly engaging the central portion of the base 13. The base 13 is formed with a circular recess 15 which receives the lower portion of a cup member 16, said cup member having a base flange 17 rotatably received in recess 15. Designated at 18 is a flat annular ring member which is secured on the peripheral portion of the base 13 in overlying relationship to the flange 17, thereby rotatably securing the member 16 to the base 13. Designated at 19 is a thumb screw which is threaded through the annular peripheral portion of the base 13 and which is lockingly engageable with the flange 17, as shown in Figure 5, whereby the member 16 may be locked in any desired adjusted position around a vertical axis, as viewed in Figures 1 and 3.

The cup member 16 is formed with the upstanding axial, externally threaded portion 20 on which is threadedly secured the cap member 21. The cap member 21 is circular in horizontal cross-section and has a hemispherical top 22. Rotatably mounted in the top 22 of the cap member is the ball 23, and integrally formed with the ball 23 is the threaded stud member 24 which extends through a slot 25 formed in the hemispherical top 22 of the cap member. Designated at 26 is a piston member which is slidably mounted inside the cap 21 and whose top surface is concave and adapted to fit against the surface of the ball 23, as shown in Figure 3. The stud 24 is threaded to fit the mounting sleeve 27 of a conventional camera 28, a conventional lock nut 29 being provided to lock the camera to the stud 24. As shown in Figure 3, the position of the camera may be oriented to any desired angle around a horizontal axis in view of the rotational adjustability of the stud 24 in the slot 25. The side wall of the cup member 16 is formed with a bore 30 which is internally threaded and in which is threadedly engaged a screw 31 having a reduced tip 32 slidably engaged in the similarly reduced inner bore portion 33. Bore portion 33 is in communication with the axial bore 34 of the cup member 16. Said axial bore is also in communication with the space beneath the piston member 26. The space defined between the piston member 26 and the cup member 16 is filled with suitable hydraulic fluid, such as oil. By tightening the screw 31, clamping pressure may be transmitted through the hydraulic fluid to the piston member 26, whereby the ball 23 may be locked in any desired position of rotational adjustment. Since the tip 32 of the screw 31 is much smaller in cross-section than the piston member 26, only a relatively small turning force is required on the screw 31 to develop a large clamping pressure on the piston member 26.

It will be readily apparent that adjustment in any direction is provided by the tripod head, positions of adjustment around a vertical axis being obtained by rotating the member 16 in the circular seat 15, and positions of adjustment around a horizontal axis being obtained by rotating the ball 23 in the cap 22. The head may be locked in adjusted position around a vertical axis by tightening the screw 19 and similarly, the adjustment around a horizontal axis may be clamped by tightening the screw plunger 31.

While a specific embodiment of an improved camera tripod head has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A camera tripod head comprising a base adapted to be fastened to a camera tripod, an upstanding cup member rotatably secured to said base for adjustment around a vertical axis, a cap member secured over said cup member, a ball rotatably mounted in the upper portion of said cap member, said cap member being formed at its top portion with a slot, a stud secured to said ball and extending through said slot, a piston member slidably disposed in said cap member beneath and engaging the underside of said ball, the space between said piston member and the cup member being adapted to contain hydraulic fluid under pressure, the wall of said cup member being formed with a relatively small bore communicating with said space, and a screw member threadedly engaged in said wall in axial alignment with said bore, said screw member being substantially larger in diameter than said bore, and a plunger element on said screw member slidably received in said bore.

2. In a camera tripod head, a base adapted to be secured to a tripod, said base being provided with an upwardly opening circular recess, a cup rotatably secured in said recess, said cup having a threaded portion of reduced diameter rising above said base and forming with the adjacent portion of said cup a shoulder, a cap threaded on said threaded portion, said cap having a lower end engaging said shoulder, said cap having a hemispherical upper end spaced above the upper end of said screw portion and provided with a transverse slot, a ball engaging the under side of the hemispherical upper end of the cap and having a stud projecting through said slot, a piston in said cap below and directly engaging the underside of said ball, said piston being spaced upwardly from the upper end of the threaded portion of said cup, the underside of the piston, the side wall of said cap and the interior of said cup providing a space for containing fluid under pressure, and means for introducing fluid into said space.

CLARE J. POOLE.

References Cited in the file of this patent

UNITED STATES PATENTS

| Number | Name | Date |
|---|---|---|
| 2,214,192 | Burnett | Sept. 10, 1940 |
| 2,332,504 | Brenner | Oct. 26, 1943 |
| 2,354,937 | Barker | Aug. 1, 1944 |
| 2,559,925 | Barker | July 10, 1951 |

FOREIGN PATENTS

| Number | Country | Date |
|---|---|---|
| 456,285 | Canada | May 3, 1949 |